(12) United States Patent
Harkare et al.

(10) Patent No.: US 11,481,203 B2
(45) Date of Patent: Oct. 25, 2022

(54) SHARED PIPELINE FOR MULTIPLE SERVICES

(71) Applicant: Forcepoint LLC, Austin, TX (US)

(72) Inventors: Mandar Harish Harkare, Cork (IE); Michael Oliver O'Mahony, Cork (IE); Robert J. O'Brien, Cork (IE); Nicole Carin Petersen, Cork (IE); Donal John Hurley, Cork (IE)

(73) Assignee: FORCEPOINT LLC, Austin, TX (US)

( * ) Notice: Subject to any disclaimer, the term of this patent is extended or adjusted under 35 U.S.C. 154(b) by 0 days.

(21) Appl. No.: 16/862,721

(22) Filed: Apr. 30, 2020

(65) Prior Publication Data

US 2021/0342136 A1     Nov. 4, 2021

(51) Int. Cl.
   *G06F 8/60*     (2018.01)
   *G06F 8/77*     (2018.01)

(52) U.S. Cl.
   CPC ............... *G06F 8/60* (2013.01); *G06F 8/77* (2013.01)

(58) Field of Classification Search
   None
   See application file for complete search history.

(56) References Cited

U.S. PATENT DOCUMENTS

| | | | |
|---|---|---|---|
| 7,363,353 B2 | 4/2008 | Ganesan et al. | |
| 7,565,644 B2 | 7/2009 | Johnson et al. | |
| 9,021,458 B1* | 4/2015 | Jacob | G06F 8/60 |
| | | | 717/168 |
| 9,081,747 B1* | 7/2015 | Tabieros | G06F 8/60 |
| 9,667,799 B2 | 5/2017 | Olivier et al. | |
| 9,693,366 B2 | 6/2017 | Adjakple et al. | |
| 9,734,086 B2 | 8/2017 | Flynn et al. | |
| 9,838,370 B2 | 12/2017 | Doering et al. | |
| 10,205,999 B2 | 2/2019 | Chavez | |
| 10,678,528 B1* | 6/2020 | Acheson | G06F 8/60 |
| 2013/0086116 A1* | 4/2013 | Agarwal | G06F 8/456 |
| | | | 707/792 |
| 2013/0155861 A1 | 6/2013 | Bryers et al. | |

(Continued)

FOREIGN PATENT DOCUMENTS

| | | |
|---|---|---|
| WO | 2011058383 | 5/2011 |
| WO | 2013155457 | 10/2013 |

*Primary Examiner* — Andrew M. Lyons
(74) *Attorney, Agent, or Firm* — Jackson Walker LLP; Christopher J. Rourk

(57) ABSTRACT

A processor-implemented method for a continuous deployment pipeline for services is disclosed that includes generating in response to a first algorithmic instruction a service identifier and parameter input process for a plurality of parameters associated with a first service, receiving a first set of parameters for the first service at the processor in response to a second algorithmic instruction, generating a third algorithmic instruction for use in providing a continuous deployment pipeline for the first service, generating in response to the first algorithmic instruction the service identifier and parameter input process for a plurality of parameters associated with a second service, receiving a second set of parameters for the second service in response to the second algorithmic instruction and modifying the third algorithmic instruction for use in providing a continuous deployment pipeline for the second service using at least a portion of the continuous deployment pipeline for the first service.

20 Claims, 5 Drawing Sheets

(56) References Cited

U.S. PATENT DOCUMENTS

| | | | | |
|---|---|---|---|---|
| 2017/0177324 | A1* | 6/2017 | Frank | G06F 16/173 |
| 2019/0129701 | A1* | 5/2019 | Hawrylo | G06F 8/60 |
| 2019/0317754 | A1* | 10/2019 | Mosquera | G06F 8/65 |
| 2019/0317757 | A1* | 10/2019 | Jodoin | G06F 8/60 |
| 2019/0340190 | A1* | 11/2019 | Ganteaume | G06F 40/30 |
| 2020/0387357 | A1* | 12/2020 | Mathon | G06F 9/5077 |
| 2021/0132935 | A1* | 5/2021 | Dinh | G06F 9/4411 |

* cited by examiner

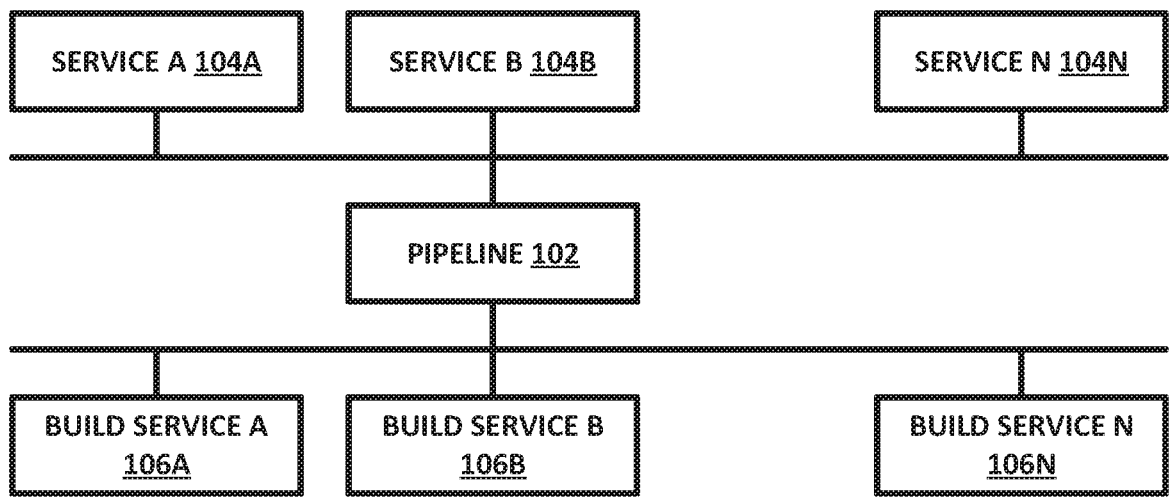

FIGURE 1      100 ↑

```
runNodeJsTerraformPipeline.groovy
def call(config) {
def pipeline = new NodeJsTerraformPipeline(this, config)
pipeline.build()
pipeline.unitTest()
pipeline.sonarQube()

}
```
208

```
NodeJsTerraformPipeline.groovy
def call(config) {
def pipeline = new NodeJsTerraformPipeline(this, config) {
this.unit_test_files = config["unit_test_files"] ? config["unit_test_files"] : "
def build() {
......
}
def unitTest() {
......
}
def sonarQube() {
......
}
```

FIGURE 2B      200B ↑      210

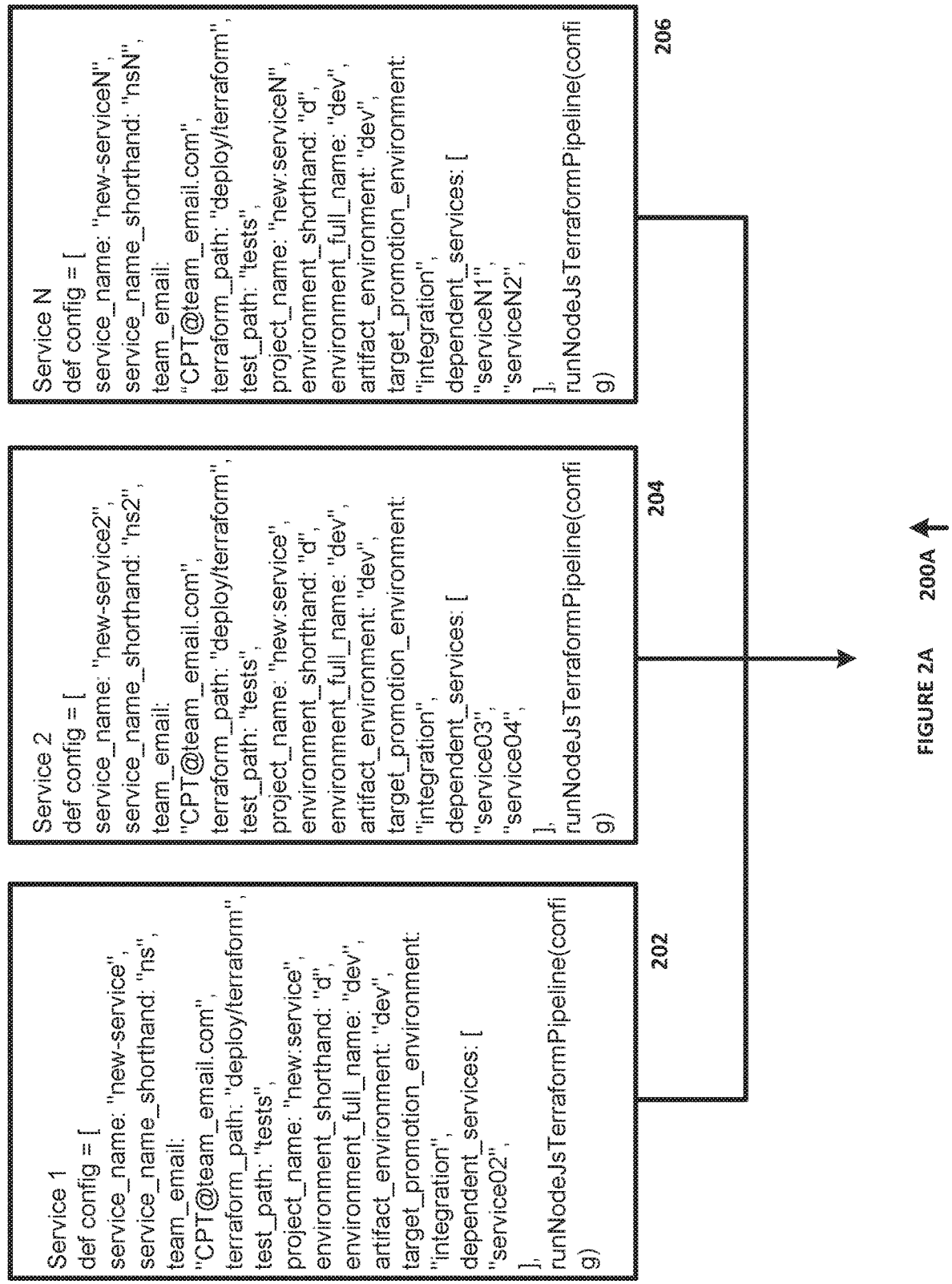
FIGURE 2A    200A

```
def config = [
service_name: "new-service",
service_name_shorthand: "ns",
team_email: "CPT-Colorado@forcepoint.com",
terraform_path: "deploy/terraform",
test_path: "tests",
project_name: "new:service",
environment_shorthand: "d",
environment_full_name: "dev",
artifact_environment: "dev",
target_promotion_environment: "integration",
dependent_services: [
"service02",
],
}
runNodeJsTerraformPipeline(config)
```
302

```
runNodeJsTerraformPipeline.groovy
def call(config) {
def pipeline = new NodeJsTerraformPipeline(this,
config)
pipeline.build()
pipeline.unitTest()
pipeline.sonarQube()
}
```
304

```
NodeJsTerraformPipeline.groovy
def call(config) {
def pipeline = new NodeJsTerraformPipeline(this, config) {
this.unit_test_files = config["unit_test_files"] ?
config["unit_test_files"] : ''
def build() {
......
}
def unitTest() {
......
}
def sonarQube() {
......
}
}
```
306

FIGURE 3     300

Pipeline 402:

| CLEAN WORKSPACE | CHECK OUT CODE | GET ENV VARS | GET SERVICE CONFIG | GET REMOTE VARIABLES | BUILD | UNIT TESTING |

| STATIC CODE ANALYSIS | QUALITY GATE | GENERATE AND PUBLISH LICENSES | CREATE TAGS | DEPLOY | SET CONFIGURATION | COMPONENT TEST |

| PUBLISH ARTIFACTS | PROMOTING ARTIFACT | SUBMIT TEST RESULTS | SEND NOTIFICATION | CLEAN WORKSPACE |

Pipeline 404:

| CLEAN WORKSPACE | CHECK OUT CODE | GET ENV VARS | UNIT TESTING | STATIC CODE ANALYSIS | GET SERVICE CONFIG | GET REMOTE VARIABLES | QUALITY GATE | GENERATE AND PUBLISH LICENSES | CREATE TAGS |

| GET LLM ZIP FROM REPOSITORY | BUILD | DOWNLOAD DYNUP | UPLOAD DYNUP | CONFIGURE LLM TENANT DB SCRIPT | COMPONENT TEST | UNIT TESTING PYTHON |

| DEPLOY | SET CONFIGURATION | PUBLISH ARTIFACTS | PROMOTING ARTIFACT | DELETE BACKUP | SUBMIT TEST RESULTS | SEND NOTIFICATION | CLEAN WORKSPACE |

| ARCHIVE DYNUP DIFFS | PERFORMANCE TESTS |

FIGURE 4    400

SHARED PIPELINE FOR MULTIPLE SERVICES

TECHNICAL FIELD

The present disclosure relates generally to a continuous software development pipeline system and method, and more specifically to a shared pipeline for multiple services that provides for continuous software development for multiple services.

BACKGROUND OF THE INVENTION

A continuous software development and deployment pipeline can be used to continuously develop and deploy new code for a software application, or to implement other changes to the software application in a production environment, i.e., where the software application is being used across an enterprise. However, such continuous software development and deployment pipelines are typically dedicated for use with a single software application.

SUMMARY OF THE INVENTION

A processor-implemented method for providing a continuous deployment pipeline for a plurality of services is disclosed. The method includes generating a service identifier and parameter input process for a plurality of parameters associated with a first service with a processor, in response to a first algorithmic instruction. A first set of parameters is received for the first service at the processor in response to a second algorithmic instruction. The processor generates a third algorithmic instruction for use in providing a continuous deployment pipeline for the first service. The processor generates the service identifier and parameter input process for a plurality of parameters associated with a second service in response to the first algorithmic instruction. A second set of parameters is received for the second service at the processor in response to the second algorithmic instruction. The processor modifies the third algorithmic instruction for use in providing a continuous deployment pipeline for the second service using at least a portion of the continuous deployment pipeline for the first service.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which:

FIG. 1 is a diagram of a first system for providing a shared pipeline for multiple services, in accordance with an example embodiment of the present disclosure;

FIGS. 2A & 2B is a diagram of a first algorithm for providing a shared pipeline for multiple services, in accordance with an example embodiment of the present disclosure;

FIG. 3 is a diagram of a second algorithm for providing a shared pipeline for multiple services, in accordance with an example embodiment of the present disclosure;

FIG. 4 is a diagram of a third algorithm for providing a shared pipeline for multiple services, in accordance with an example embodiment of the present disclosure.

DETAILED DESCRIPTION OF THE INVENTION

Figure 5:
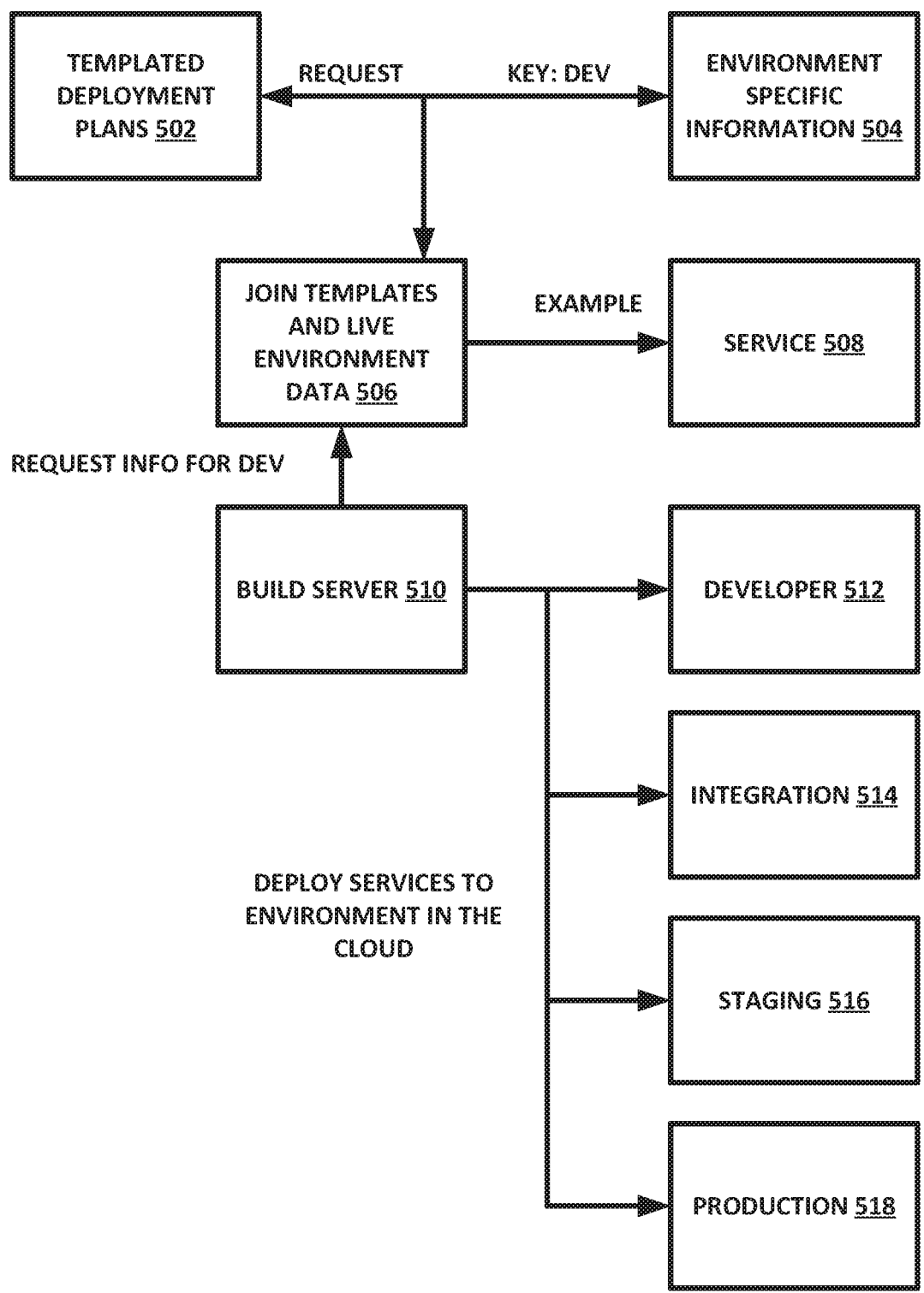
FIG. 5 is a diagram of a second system for providing a shared pipeline for multiple services, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

FIG. 1 is a diagram 100 of a first system for providing a shared pipeline for multiple services, in accordance with an example embodiment of the present disclosure. Diagram 100 includes service A 104A through service N 104N, pipeline 102 and build service A 106A through build service N 106N, each of which can be implemented in hardware or a suitable combination of hardware and software.

A software development and deployment pipeline such as pipeline 102 refers to a system implemented with special-purpose processors and algorithms that allow software to be developed and tested by a plurality of users, and can include systems and algorithms that are used to identify a need for new software or new software features and associated requirements, systems and algorithms that are used to program the new features, systems and algorithms that are used to test the new features and systems and algorithms that are used to review the final software configuration to ensure that it meets the requirements, and numerous other systems and algorithms as discussed herein, depending on the specific situation. In addition, different services can use different pipelines for deployment, which can make the systems and algorithms that are used to deploy these different services incompatible when it comes to modifying the pipelines or keeping all the pipelines aligned. Because many of the users that are involved with continuous software deployment function in multiple different roles, the current environment is prone to confusion, misoperation and error, but this problem has not previously been identified. The present disclosure provides systems and methods for correcting this previously unidentified problem.

The present disclosure allows multiple services such as service A 104A through service N 104 N to use a single shared pipeline for continuous development and deployment, such as pipeline 102, by using parameters that are shared in a software development automation process such as Jenkins, which is an open source software development platform available from https://jenkins.io/. A parameter-based pipeline for use with multiple services provides more flexibility to accommodate future services without having to create new pipelines.

The present disclosure allows a text file of parameters, such as a Jenkins file or other suitable parameter files, to be used as a map of parameters and a call to function to execute pipeline 102. Main logic can be provided for use in the function call itself, and the functionality can go in pipeline 102 or other suitable systems or components.

In another example embodiment, multiple pipelines can be modified to accommodate an existing group of pipelines that have already been incorporated into the solution using the present disclosure. In this manner, deployment of new software that uses a pipeline that has not previously been incorporated into pipeline 102 can allow that pipeline to be incorporated in an optimized manner, when the new software is being developed, as opposed to incorporating the pipeline into the system and method of the present disclosure when no software is being developed.

One aspect of the present disclosure is the ability to utilize multiple cloud services, such as service A 104A through service N 104N, which can either be independent of each other or not, and where the development, provisioning and deployment (versioning) of these services can occur separately. By using continuous integration and continuous delivery tools as code, such as the Jenkins pipelines or other suitable tools, multiple pipelines for different services can be combined and used to develop, deploy and provision multiple services. Without the teachings of the present disclosure, the ability to change the approach for a single service pipeline to an approach that encompasses many different service pipelines can become unmanageable. The present disclosure introduces a mechanism that simplifies the automated deployment of these services with the use of single pipeline interface, which can be shared by all the services. The use of a single pipeline interface eases the maintainability of code, reduces the efforts and time to develop and deploy new services, increases engineering velocity and feature agility to production and provides numerous other advantages.

The present disclosure can be used to create one pipeline class, such as a Jenkins pipeline class or other suitable classes, which can have the methods required for deploying the services, a function that can be called from each service with associated parameters that are needed to utilize the class, and other suitable functions. The function that can be called from each service with parameters can execute the deployment steps and/or methods from the pipeline class based on the service-specific parameters that are passed. To reduce complexity, multiple functions for different service can be used, but the process steps can be executed from a single pipeline class.

FIGS. 2A & 2B is a diagram 200 of a first algorithm for providing a shared pipeline for multiple services, in accordance with an example embodiment of the present disclosure. The first algorithm includes services 202, 204 and 206, which are processed by pipeline 208 and 210. The algorithm can be implemented on one or more processors, and can include a number of functions that can be described in the manner discussed below or in other suitable manners, such as using object-oriented programming tools, state diagrams, ladder diagrams or in other suitable manners. Some functions can be used in multiple system components, and are not limited to the specific example embodiments provided herein.

In one example embodiment, build jobs are discussed below that are directed to two different services that use a shared pipeline. The second service has additional deployment steps relative to the first service, and can be achieved by sending different parameters in the associated algorithmic functions from that service or in other suitable manners. These build jobs use a single master pipeline, and can be modified from an environment that uses a separate pipeline by modifying the build job to match the master pipeline.

In this example embodiment, service 1 of service 202 can be a variable, where multiple services can be used to provide configuration inputs (which are identified as "config" below), such as to a function named "runNodeJsTerraformPipeline( )" (see below), or other suitable functions. A function can be an algorithm or other suitable code structures that are loaded into memory devices of a processor and that are used to cause the processor to perform predetermined functions, as discussed herein. Service 1 can be related to a map object that is named "config," and which can be used to define a configuration that is required to deploy a given service (such as a cloud application, cloud infrastructure or other suitable services). An object can be an algorithm or other suitable code structures that are loaded into memory devices of a processor and that are used to cause the processor to perform predetermined functions, as discussed herein.

In regards to "def config=[," the key service-name is not constant, and the name can be changed, depending on which application or other software infrastructure is to be provisioned, such as in a cloud computing services account such as an Amazon Web Services (AWS) account (see "environment" description below), or other suitable accounts. For example, "new-service" and "new-service-2" can be the services associated with service-name.

In regards to service_name: "new-service" of service 202, the key service_name_shorthand is a data value that can be used within the naming convention of a cloud services provider such as AWS resources or other suitable services, and which allows the disclosed algorithm to interact with the cloud services provider in the same manner for all services that are using the pipeline. This is a novel approach to interacting with such cloud services providers, and allows the pipeline to be used for multiple different services in a manner that can use different cloud services. This facilitates the ability to use a single pipeline for multiple services.

In regards to service_name_shorthand: "ns," the pipeline can send notifications to different channels, one being email, which allows an email address to be submitted in the configuration MAP object, with the key name team_email. This process can be used to identify an additional point of contact associated with the pipeline.

In regards to team_email: CPT@team_email.com, the key terraform_path points to a directory of the infrastructure source code, which stores the "Terraform" infrastructure as code (modules). Likewise, other suitable infrastructure as code services can also or alternatively be used. These modules are configuration descriptions of the applications and infrastructure that can be provisioned in the cloud. For example, the applications and infrastructure can include provisioning of an AWS Lambda, provisioning an AWS Elastic Compute Cloud server (EC2), or other suitable applications and infrastructure.

In regards to terraform_path: "deploy/terraform," test_path points to a directory of the source code, which can be used to store code which tests applications and infrastructure in an automated fashion following deployment/provisioning in the cloud computing environment. For example, a request can be sent to an application to verify whether it is working as expected or not (such as where the pipeline feedback is provided to an engineer, who can determine whether what is provisioned is "healthy").

In regards to test_path: "tests," the key project_name is a variable value, which is passed to a command line interface (CLI) tool which is invoked within the pipeline. When the CLI tool is invoked within the pipeline, the cloud resource can have defined 'default' "Tags" applied to the resource for when they are provisioned in the cloud. These "Tags" can be used for reporting to other services or applications, can be used to identify particular resources, can be used to run automated tasks against resources with specific tag values, or can be used for other suitable purposes.

In regards to project_name: "new:service," the key environment_shorthand: "d" is a value that can be used within the naming convention of a cloud services provider, such as AWS resources, passed as a parameter to pipeline functions to return further specific deployment time arguments, or for other suitable purposes. This value is also not constant, and can be d, s, p (development, staging, production) or other suitable values.

In regards to environment_shorthand: "d," the key environment_full_name can be used to identify which cloud services provider account, such as an AWS account, or developer environment is to provision the cloud services applications and infrastructure within. This value is also not constant, and can be d, s, p (developer, staging, production) or other suitable values.

In regards to environment_full_name: "dev," the key artifact_environment can be used to point to one or more repositories for a given service, which can be stored in a third party artifact repository application, such as the JFrog Artifactory or other suitable applications. The one or more repositories can be configured to store binaries (such as zip file) of source code, which may have passed an engineering "definition of done" or other suitable standards. In one example embodiment, the source code can be tested and "promoted" to an application, and can qualify for a release to an upstream environment, such as production. The binaries can be made available for download via pipeline 102 or in other suitable manners, such as in python and/or node modules for installation, as binaries which are helper modules or CLI tools are that are also stored in the artifact repository application.

In regards to artifact_environment: "dev," the key target_promotion_environment can be used in the automation of the pipeline, to push a binary (such as a zip file or docker container) to the artifact repository application. The binaries can be used to store source code which has been checked out from a suitable source code repository (such as GitHub Enterprise), deployed to a cloud services provider and which has passed tests. At this point, the binaries can be classified as "releasable candidates," for delivery to upstream environments, such as "Production" or other suitable environments.

In regards to target_promotion_environment: "integration," the key dependent_services can be used to supply the names of particular cloud services which the service (service_name) being provisioned has a dependency on, such as a tight coupling between services. The dependency can be a test dependency, a provisioning dependency (such as to test service_name against "service02" once service_name is provisioned, an indication to ensure that "service02," or other suitable functions.

In regards to dependent_services: ["service02," the function called "runNodeJsTerraformPipeline( )" takes the defined "config" MAP object as input, as discussed above. This function can be defined in a shared library, such as a "Jenkins Shared Library" using Groovy language source code, which can be leveraged as "Pipeline as Code" or automation in code. That allows this function to be reusable for many service deployments and/or provisioning functions. This function can be the "config" described above, which can define the actions taken within the "runNodeJsTerraformPipeline" pipeline based upon the parameter values such as which artifact for a given service is to be deployed to a given environment, which environment the artifact is to be promoted to, which tests are to be ran against the service, which deployment and run-time parameters are to be read from the cloud services parameters (such as the AWS Parameter Store), or other suitable functions.

In regards to runNodeJsTerraformPipeline(config) in 208, this is the function definition itself in relation to runNodeJsTerraformPipeline( ), as discussed above.

In regards to runNodeJsTerraformPipeline.groovy, this can be a file stored within a shared library, such as the "Jenkins Shared Library", as described above.

In regards to runNodeJsTerraformPipeline.groovy, within a shared library, the function name may be defined as the filename, where the functions themselves can then be defined with the value "call." In the scenario discussed below, the "config" Map object can be passed as a parameter.

In regards to def call(config), the class named "NodeJsTerraformPipeline" can be instantiated, and the class can be assigned to an object, such as an object named "pipeline," which can be used to pass the "config" to the class. The class can contain methods such as "build( )," "unitTest( )" and "deploy( )," or other suitable methods. These methods can be invoked in the desired order for a given pipeline.

In operation, diagram 200 allows multiple services to use a shared pipeline, to simplify automated deployment of services. The present disclosure improves the maintainability of code, and reduces the time required to stand up new services by increasing engineering velocity and feature agility to production.

FIG. 3 is a diagram 300 of a second algorithm for providing a shared pipeline for multiple services, in accordance with an example embodiment of the present disclosure. The second algorithm includes data structures 302, 304 and 306, each of which can be implemented in hardware or a suitable combination of hardware and software. Data structure 302 is an example shared file for services, such as a Jenkins file. Data structure 304 is an example function which one or more services can call, with parameters. Data structure 306 is an example pipeline class. The present disclosure can be used to create a software development automation process class, such as a Jenkins pipeline class, which can have one or more methods that are needed to deploy services, and which have a function that can be called from each service with parameters. The function can be used to execute deployment steps and methods from the pipeline class, based on service specific parameters that are passed. To reduce complexity, multiple functions can be provided for each for different service, but can the steps can be executed from single pipeline class.

FIG. 4 is a diagram 400 of a third algorithm for providing a shared pipeline for multiple services, in accordance with an example embodiment of the present disclosure. The third algorithm includes build jobs 402 and 404, each of which can be implemented in hardware or a suitable combination of hardware and software. Diagram 400 includes two build jobs for two different services that use a shared pipeline, where the second service has additional deployment steps that can be achieved by sending different parameters from that service.

Service 402 includes the following deployment steps, which expand on the concepts discussed above in regards to FIGS. 2A and 2B:

Clean workspace—this function can be implemented as a Jenkins function or in other suitable manners, and is used to clean out the workspace.

Check out code—this function can be implemented as a Jenkins function or in other suitable manners, and is used to check out the code.

Get environment variables—this function can be implemented as a Jenkins function or in other suitable manners, and is used to get environmental variables.

Get service configuration—this function can be implemented as a Jenkins function or in other suitable manners, and is used to get a service configuration.

Get remote variables—this function can be implemented as a Jenkins function or in other suitable manners, and is used to get remote variables.

Build—this function can be implemented as a Jenkins function or in other suitable manners, and is used to build the service.

Unit testing—this function can be implemented as a Jenkins function or in other suitable manners, and is used to conduct unit testing.

Static code analysis—this function can be implemented as a Jenkins function or in other suitable manners, and is used to perform static code analysis.

Quality gate—this function can be implemented as a Jenkins function or in other suitable manners, and is used to perform a quality gate analysis.

Generate and publish licenses—this function can be implemented as a Jenkins function or in other suitable manners, and is used to generate and publish licenses.

Create tags—this function can be implemented as a Jenkins function or in other suitable manners, and is used to create tags.

Deploy—this function can be implemented as a Jenkins function or in other suitable manners, and is used to deploy a service.

Set configuration—this function can be implemented as a Jenkins function or in other suitable manners, and is used to set a configuration.

Component test—this function can be implemented as a Jenkins function or in other suitable manners, and is used to perform a component test.

Publish artifacts—this function can be implemented as a Jenkins function or in other suitable manners, and is used to publish artifacts.

Promote artifacts—this function can be implemented as a Jenkins function or in other suitable manners, and is used to promote artifacts.

Submit test results—this function can be implemented as a Jenkins function or in other suitable manners, and is used to submit test results.

Send notification—this function can be implemented as a Jenkins function or in other suitable manners, and is used to send a notification.

Clean workspace—this function can be implemented as a Jenkins function or in other suitable manners, and is used to clean a workspace.

Service 404 includes the following additional deployment steps:

Create backup—this function can be implemented as a Jenkins function or in other suitable manners, and is used to create a backup.

Create tags—this function can be implemented as a Jenkins function or in other suitable manners, and is used to create tags.

Get LLM zip from artifact repository—this function can be implemented as a Jenkins function or in other suitable manners, and is used to get an LLM zip file from an artifact repository.

Download dynup—this function can be implemented as a Jenkins function or in other suitable manners, and is used to download a dynamic DNS updater.

Upload dynup—this function can be implemented as a Jenkins function or in other suitable manners, and is used to upload a dynamic DNS updater.

Configure LLM tenant DB script—this function can be implemented as a Jenkins function or in other suitable manners, and is used to configure an LLM tenant DB script.

Component test—this function can be implemented as a Jenkins function or in other suitable manners, and is used to perform a component test.

Unit testing python—this function can be implemented as a Jenkins function or in other suitable manners, and is used to perform python unit testing.

Archive dynup diffs—this function can be implemented as a Jenkins function or in other suitable manners, and is used to archive dynamic DNS updater differences.

Performance tests—this function can be implemented as a Jenkins function or in other suitable manners, and is used for performance tests.

In operation, diagram 400 provides examples of build jobs that use a shared pipeline for multiple services.

FIG. 5 is a diagram 500 of a second system for providing a shared pipeline for multiple services, in accordance with an example embodiment of the present disclosure. The second system includes template deployment plans 502, environment specific information 504, join templates and live environment data 506, service 508, build server 510, developer 512, integration 514, staging 516 and production 518, each of which can be implemented in hardware or a suitable combination of hardware and software. Diagram 500 provides a centralized environment lookup with template-based plans for jobs.

Template deployment plans 502 can be implemented as one or more algorithms that are used to cause a processor to perform functions for allowing template deployment plans to be implemented. In one example embodiment, the template deployment plans can be provided in response to a request or in other suitable manners.

Environment specific information 504 can be implemented as one or more algorithms that are used to cause a processor to perform functions for providing environment specific information. In one example embodiment, the environment specific information can be provided in response to a developer key or in other suitable manners.

Join templates and live environment data 506 can be implemented as one or more algorithms that are used to cause a processor to perform functions for joining templates and live environment data. In one example embodiment, join templates and live environment data 506 can receive a request for information for a developer and can generate associated requests for template deployment plans, environment deployment plans or other suitable data.

Service 508 is an example of a service that can be implemented using diagram 500. Service 508 can be implemented as one or more algorithms that are used to cause a processor to perform functions for providing the service.

Build server 510 can be implemented as one or more algorithms that are used to cause a processor to perform functions for deploying a service to an environment in a cloud computing environment. In one example embodiment, build server 510 can deploy the service to developer 512, integration 514, staging 516 and production 518.

The present disclosure includes a processor-implemented method for providing a continuous deployment pipeline for a plurality of services, where the method comprises generating with a processor in response to a first algorithmic instruction a service identifier and parameter input process for a plurality of parameters associated with a first service. Receiving a first set of parameters for the first service at the processor in response to a second algorithmic instruction. Generating with the processor a third algorithmic instruction for use in providing a continuous deployment pipeline for the first service. Generating with the processor in response to the first algorithmic instruction the service identifier and parameter input process for a plurality of parameters associated with a second service. Receiving a second set of parameters for the second service at the processor in response to the second algorithmic instruction. Modifying with the processor the third algorithmic instruction for use in providing a continuous deployment pipeline for the second service using at least a portion of the continuous deployment pipeline for the first service.

Generating with the processor in response to the first algorithmic instruction the service identifier and the parameter input process for the plurality of parameters associated with the first service can include generating a user interface control to allow a user to select the parameters from a list of available parameters. For example, the user interface control can be configured to allow the user to submit the parameters at an appropriate time, under appropriate conditions, or for other suitable purposes, such as described further herein.

Receiving the first set of parameters for the first service at the processor in response to the second algorithmic instruction can include generating a user interface control to allow a user to submit the first set of parameters. For example, the user interface control can be configured to allow the user to submit the parameters at an appropriate time, under appropriate conditions, or for other suitable purposes, such as described further herein.

Generating with the processor the third algorithmic instruction for use in providing the continuous deployment pipeline for the first service can include generating a user interface control to allow a user to utilize the continuous deployment pipeline. For example, the user interface control can be configured to allow the user to utilize the continuous deployment pipeline at an appropriate time, under appropriate conditions, or for other suitable purposes, such as described further herein.

Generating with the processor in response to the first algorithmic instruction the service identifier and the parameter input process for the plurality of parameters associated with the second service can include generating a user interface control to allow a user to select the parameters from a list of available parameters. For example, the user interface control can be configured to allow the user to select the parameters at an appropriate time, under appropriate conditions, or for other suitable purposes, such as described further herein.

Receiving the second set of parameters for the second service at the processor in response to the second algorithmic instruction can include generating a user interface control to allow a user to submit the parameters. For example, the user interface control can be configured to allow the user to submit the parameters at an appropriate time, under appropriate conditions, or for other suitable purposes, such as described further herein.

Modifying with the processor the third algorithmic instruction for use in providing the continuous deployment pipeline for the second service using at least the portion of the continuous deployment pipeline for the first service can include generating a user interface control to allow a user to utilize the continuous deployment pipeline. For example, the user interface control can be configured to allow the user to utilize the continuous deployment pipeline at an appropriate time, under appropriate conditions, or for other suitable purposes, such as described further herein.

A build server can deploy the first service to a developer environment, an integration environment, a staging environment, a production environment or other suitable environments.

A user control can be generated in a user interface to cause a build server to deploy the first service to a developer environment, an integration environment, a staging environment, a production environment or other suitable environments. For example, the user control can be configured to allow the user to cause a build server to deploy the first service to a developer environment, an integration environment, a staging environment, a production environment or other suitable environments at an appropriate time, under appropriate conditions, or for other suitable purposes, such as described further herein.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. A software system is typically created as an algorithmic source code by a human programmer, and the source code algorithm is then compiled into a machine language algorithm with the source code algorithm functions, and linked to the specific input/output devices, dynamic link libraries and other specific hardware and software components of a processor, which converts the processor from a general purpose processor into a specific purpose processor. This well-known process for implementing an algorithm using a processor should require no explanation for one of even rudimentary skill in the art. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. A system can receive one or more data inputs, such as data fields, user-entered data, control data in response to a user prompt or other suitable data, and can determine an action to take based on an algorithm, such as to proceed to a next algorithmic step if data is received, to repeat a prompt if data is not received, to perform a mathematical operation on two data fields, to sort or display data fields or to perform other suitable well-known algorithmic functions. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A processor-implemented method for providing a continuous deployment pipeline for a plurality of services, the method comprising:
    generating with a processor in response to a first algorithmic instruction a service identifier and parameter input process for a plurality of parameters associated with a first service;
    receiving a first set of parameters to achieve a first set of deployment steps for the first service at the processor in response to a second algorithmic instruction;
    generating with the processor a third algorithmic instruction for use in providing a first continuous deployment pipeline for the first service;
    generating with the processor in response to the first algorithmic instruction the service identifier and parameter input process for a plurality of parameters associated with a second service;
    receiving a second set of parameters to achieve a second set of deployment steps for the second service at the processor in response to the second algorithmic instruction; and
    modifying with the processor the third algorithmic instruction for use in providing a second continuous deployment pipeline for the second service using at least a portion of the first set of deployment steps of the first continuous deployment pipeline for the first service and the second set of deployment steps for the second service, wherein generating with the processor the third algorithmic instruction for use in providing the first continuous deployment pipeline for the first service comprises generating a user interface control to allow a user to utilize the first continuous deployment pipeline to add a get remote variables deployment step prior to a build deployment step in the first continuous deployment pipeline.

2. The method of claim 1 wherein generating with the processor in response to the first algorithmic instruction the service identifier and the parameter input process for the plurality of parameters associated with the first service comprises generating a first user interface control configured to allow a user to select the parameters from a list of available parameters for the first service and a second user interface control configured to allow the user to select the second set of deployment steps from a list of available deployment steps for the first service.

3. The method of claim 1 wherein receiving the first set of parameters for the first service at the processor in response to the second algorithmic instruction comprises generating a user interface control configured to allow a user to submit the first set of parameters at a predetermined time.

4. The method of claim 1 wherein generating with the processor in response to the first algorithmic instruction the service identifier and the parameter input process for the plurality of parameters associated with the second service comprises generating a user interface control to allow a user to select the parameters from a list of available parameters.

5. The method of claim 1 wherein receiving the second set of parameters to achieve the second set of deployment steps for the second service at the processor in response to the second algorithmic instruction comprises generating a user interface control to allow a user to submit the parameters.

6. The method of claim 1 wherein modifying with the processor the third algorithmic instruction for use in providing the second continuous deployment pipeline for the second service using at least the portion of the first set of deployment steps for the first continuous deployment pipeline for the first service comprises generating a user interface control to allow a user to utilize the first continuous deployment pipeline to add a create backup deployment step between a get remote variables deployment step and a build deployment step in the first continuous deployment pipeline to generate the second continuous deployment pipeline.

7. The method of claim 1 wherein a build server deploys the first service to a developer environment.

8. The method of claim 1 wherein a build server deploys the first service to an integration environment.

9. The method of claim 1 wherein a build server deploys the first service to a staging environment.

10. The method of claim 1 wherein a build server deploys the first service to a production environment.

11. The method of claim 1 further comprising generating a user control to cause a build server to deploy the first service to a developer environment.

12. The method of claim 1 further comprising generating a user control at a pipeline interface to cause a build server to deploy one of the first service and the second service to an integration environment.

13. The method of claim 1 further comprising generating a user control to cause a build server to deploy the first service to a staging environment.

14. The method of claim 1 further comprising generating a user control to cause a build server to deploy the first service to a production environment.

15. The method of claim 1 wherein the first set of parameters for the first service is received at the processor using a service interface in response to a second algorithmic instruction.

16. The method of claim 1 wherein the first service identifier and the parameter input process are generated for a pipeline interface.

17. A processor-implemented method for providing a continuous deployment pipeline for a plurality of services, the method comprising:
generating with a processor in response to a first algorithmic instruction a service identifier and parameter input process for a plurality of parameters associated with a first service;
receiving a first set of parameters to achieve a first set of deployment steps for the first service at the processor using a service interface in response to a second algorithmic instruction;
generating with the processor a third algorithmic instruction for use in providing a first continuous deployment pipeline for the first service;
generating with the processor in response to the first algorithmic instruction the service identifier and parameter input process for a plurality of parameters associated with a second service;
receiving a second set of parameters to achieve a second set of deployment steps for the second service at the processor using the service interface in response to the second algorithmic instruction;
modifying with the processor the third algorithmic instruction for use in providing a second continuous deployment pipeline for the second service using at least a portion of the first set of deployment steps of the first continuous deployment pipeline for the first service and the second set of deployment steps for the second service, wherein a portion of the first continuous deployment pipeline is used for the second service and comprises at least one of a create backup deployment step, a create tags deployment step or a get zip file from repository deployment step after a get remote variables deployment step and before a build deployment step, and at least one of a unit testing deployment step, an archive deployment step and a performance test deployment step after a component test deployment step and before a publish artifacts deployment step of the first continuous deployment pipeline.

18. A processor-implemented method for providing a continuous deployment pipeline for a plurality of services, the method comprising:
generating with a processor in response to a first algorithmic instruction a first service identifier and parameter input process for a pipeline interface, the first service identifier and parameter input process having a plurality of first deployment steps associated with a first service;
receiving a first set of first deployment steps for the first service at the processor using the pipeline interface in response to a second algorithmic instruction;
generating with the processor a third algorithmic instruction for use in providing a first continuous deployment pipeline for the first service;
generating with the processor in response to the first algorithmic instruction a second service identifier and parameter input process for the pipeline interface, the second service identifier and parameter input process having a plurality of second deployment steps associated with a second service;
receiving a second set of second deployment steps for the second service at the processor using the pipeline interface in response to the second algorithmic instruction;
modifying with the processor the third algorithmic instruction for use in providing a second continuous deployment pipeline for the second service using at least a portion of the first continuous deployment pipeline for the first service and a distinct portion for the second service, wherein the distinct portion for the second service comprises at least one of a create backup deployment step, a create tags deployment step or a get zip file from repository deployment step after a get remote variables deployment step and before a build deployment step, and at least one of a unit testing deployment step, an archive deployment step and a performance test deployment step after a component test deployment step and before a publish artifacts deployment step of the first continuous deployment pipeline.

19. A processor-implemented method for providing a continuous deployment pipeline for a plurality of services, the method comprising:
generating with a processor in response to a first algorithmic instruction a service identifier and parameter input process for a plurality of parameters associated with a first service;
receiving a first set of parameters to achieve a first set of deployment steps for the first service at the processor in response to a second algorithmic instruction;
generating with the processor a third algorithmic instruction for use in providing a first continuous deployment pipeline for the first service;
generating with the processor in response to the first algorithmic instruction the service identifier and parameter input process for a plurality of parameters associated with a second service;

receiving a second set of parameters to achieve a second set of deployment steps for the second service at the processor in response to the second algorithmic instruction; and modifying with the processor the third algorithmic instruction for use in providing a second continuous deployment pipeline for the second service using at least a portion of the first set of deployment steps of the first continuous deployment pipeline for the first service and the second set of deployment steps for the second service; wherein modifying with the processor the third algorithmic instruction for use in providing the second continuous deployment pipeline for the second service using at least the portion of the first set of deployment steps for the first continuous deployment pipeline for the first service comprises generating a user interface control to allow a user to utilize the first continuous deployment pipeline to add a create backup deployment step between a get remote variables deployment step and a build deployment step in the first continuous deployment pipeline to generate the second continuous deployment pipeline.

20. The method of claim 19 wherein a build server deploys the first service to a developer environment.

* * * * *